United States Patent [19]
Fishman et al.

[11] Patent Number: 5,160,068
[45] Date of Patent: Nov. 3, 1992

[54] AUTOMATIC DISPENSING FEEDER HAVING A LINEAR ACTIVATOR AND A FELXIBLE SKIMMER

[75] Inventors: Udi Fishman; Harry Park, both of San Jose, Calif.

[73] Assignee: Aedi, Inc., Santa Clara, Calif.

[21] Appl. No.: 420,102

[22] Filed: Oct. 11, 1989

[51] Int. Cl.$^5$ ............................................. G01F 11/10
[52] U.S. Cl. ....................... 222/352; 222/228; 222/242; 222/370; 222/23; 222/504; 222/556; 119/51.02; 119/51.02; 119/56.1
[58] Field of Search ............... 222/64, 36, 37, 39, 222/650, 238, 239, 240, 242, 228, 345, 349, 352, 368-370, 215, 23, 504, 556; 119/51.11, 56.1, 51.02, 56.2

[56] References Cited

U.S. PATENT DOCUMENTS

| | | | |
|---|---|---|---|
| 1,291,759 | 1/1919 | Krotz | 222/352 |
| 1,397,689 | 12/1921 | Bunnell | 222/239 |
| 1,639,370 | 8/1927 | Flegel | 222/239 |
| 1,979,948 | 12/1934 | Leake | 222/197 |
| 2,037,555 | 4/1936 | Zwoyer | 222/352 |
| 2,786,448 | 3/1957 | McMaster | 119/56.1 |
| 3,150,798 | 9/1964 | Sutton | 222/650 |
| 3,653,543 | 4/1972 | Preikschat | 222/64 |
| 3,874,559 | 4/1975 | Pink | 222/370 X |
| 3,972,449 | 8/1976 | Smith | 222/64 |
| 4,148,415 | 4/1979 | Florida et al. | 222/37 |
| 4,167,248 | 9/1979 | Akazawa et al. | 222/242 |
| 4,183,327 | 1/1980 | Olson | 119/51.11 |
| 4,527,714 | 7/1985 | Bowman | 222/64 |
| 4,722,300 | 2/1988 | Walker et al. | 222/650 |
| 4,930,685 | 6/1990 | Landers | 222/370 |
| 5,064,104 | 11/1991 | Milton et al. | 222/352 X |
| 5,094,403 | 3/1992 | Tschumi | 222/370 X |
| 5,104,007 | 4/1992 | Utter | 222/242 X |

FOREIGN PATENT DOCUMENTS

| | | | |
|---|---|---|---|
| 2563641 | 10/1985 | France | 119/51.11 |
| 2166934 | 9/1985 | United Kingdom | 119/51.11 |

*Primary Examiner*—Michael S. Huppert
*Assistant Examiner*—Kenneth DeRosa
*Attorney, Agent, or Firm*—Lahive & Cockfield

[57] ABSTRACT

Automatic dispensing apparatus for accurately dispensing preselected amounts of material. The apparatus includes a paddle wheel assembly having multiple compartments for holding selected amounts of material to be dispensed. The apparatus further includes an agitator assembly to break down the material, and a flexible skimmer element for removing excess material from the compartments before dispensing to ensure precise measurements. The paddle wheel assembly and the agitator assembly are driven by a linear actuator. A shutter shields the dispensing mechanism and the material from external elements. The shutter is automatically activated to open and tightly close in sequence with the dispensing cycle. The apparatus further includes a programmable microprocessor for controlling and monitoring the dispensing cycle.

20 Claims, 18 Drawing Sheets

1

AUTOMATIC DISPENSING FEEDER HAVING A LINEAR ACTIVATOR AND A FELXIBLE SKIMMER

BACKGROUND OF THE ART

There are presently available on the market or reported in literature, a variety of canisters for storing and dispensing materials and in particular dry goods, such as kitchen ingredients, animal food and the like. In general, these devices include a storage compartment which allows the materials to come in contact with a dispensing mechanism. The dispensing mechanism can include a paddle wheel arrangement such as found in U.S. Pat. No. 2,750,072 or U.S. Pat. No 4,148,415. Further, as can be seen in U.S. Pat. No. 2,750,072 often an agitating mechanism is provided in order to agitate the materials stored in the container, allowing such materials to be properly provided to the dispensing means. Further, some devices such as the device shown in U.S. Pat. No. 2,750,072 provides for preselecting an amount of material which the container then dispenses. In general, the prior devices include a variety of designs for the rotating compartmental rigid plate use as the dispensing apparatus. However, often times due to caking of the materials in the container the proper amount of materials are not reliably and accurately dispensed. Caking frequently occurs in the container as a result of humidity or if the materials sit for extended periods of time. The presence of humidity in the canister can be caused by penetration through cracks or openings such as the dispensing port. In some instances, complete blockage of the operation is caused by large particles of material in the rotating chambers of the paddle wheel which is made of rigid construction, as in the present invention. An additional problem faced by previous inventions is inaccurate amounts of material being dispensed as a result of low levels of materials in the canister. When the canister contents are low, there is less weight to push the remaining ingredients down towards the compartments, causing them to be filled with a lesser density of material.

SUMMARY OF INVENTION

The present invention is directed towards an automatic dry ingredient dispenser which solves the problems encountered by the prior art and provides for reliable and accurate dispensing of dry materials.

The automatic dispenser includes a housing defining an internal cavity for storing dry materials to be dispensed and a dispensing port defined by the housing. Means are provided for dispensing an accurately measured amount of material through the dispensing port. The dispensing means include a paddle wheel arrangement having a plurality of compartments, each compartment dispensing a measured volume of dry materials and means for causing the paddle wheel arrangement to rotate past the dispensing port. Further, means are provided for agitating the material stored in the housing. Additionally, this invention provides a means for compacting the material as it enters the measuring compartments.

Another aspect of the invention is an agitator made of a stirrer mechanism that includes a plurality of fingers extending from a central hub. The fingers are of varying length, with some of the fingers formed so as to rotate past sloping walls of the internal cavity in the canister, and prevent stored materials from stagnating in the hopper.

Yet another aspect of the invention is the dispensing apparatus which includes a linear actuator solenoid for causing the dispensing paddle wheel to rotate slowly and in small precise increments. Means are provided to operate and program the time at which to dispense and the compartmental amount of material to be dispensed. This programming means defines the set start times and the number of compartments to be dispensed. The linear actuator causes the paddle wheel to rotate by means of a transfer plate thus causing the material to be dispensed through the dispensing port. The linear actuator solenoid automatically disables at the end of the dispensing cycle only when the paddle wheel compartments are aligned precisely with the dispensing port so as not to dispense ½ a compartment.

Yet a further aspect of the present invention includes a linear actuated solenoid that vibrates in an up and down motion to compact the material and to ensure that the amount of materials in each compartment is constant regardless of the amount of material in the internal cavity. The vertical vibration helps solve the problem of inaccurate dispensing.

Thus it is an object of the present invention to provide an automatic dispensing canister which operates reliably and accurately.

It is a further aspect of the present invention to provide an automatic dispenser that can accommodate a wide variety of dry materials with large or small grains which have a tendency to cake and to absorb water.

BRIEF DESCRIPTIONS OF DRAWINGS

DETAILED DESCRIPTION OF PREFERRED EMBODIMENTS

Figure 1:
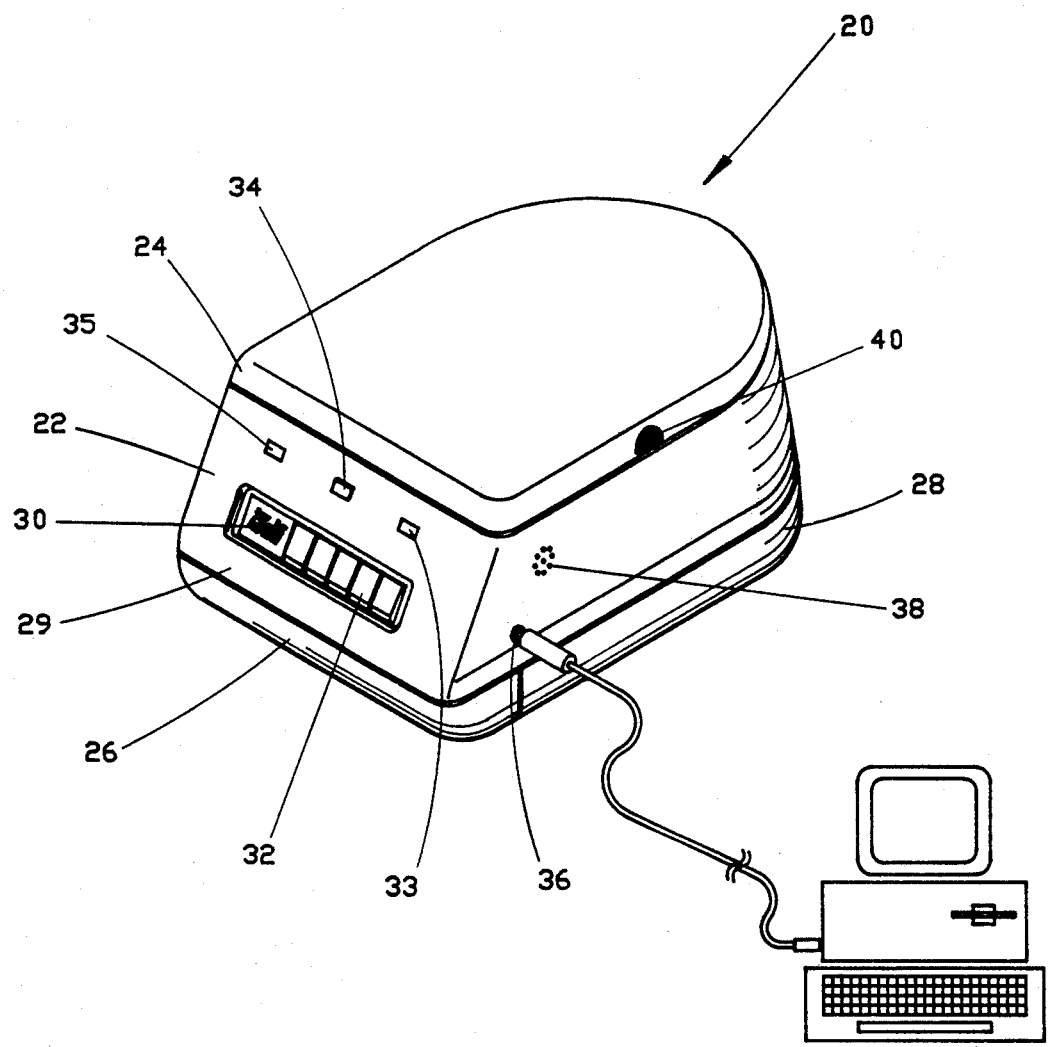
FIG. 1 is a perspective view of Top, Right Side and Front aspects of material dispensing apparatus.

In reference to the figures, and in particular FIG. 1, the invention depicts and identifies the Automatic Dispensing Feeder by the number (20). The Automatic Dispensing Feeder includes: a main housing (22), a top cover (24), and a base (28). Further, in the lower front section, is a battery compartment cover (26). Located on the front of the Automatic Dispensing Feeder is the control panel (29) with data display panel (30), programming push buttons (32) and row of indicator lights (33,34,35). To the right side of the front panel (29) and in FIG. 4 is the external electrical connection (36) for data or power, and an audio output buzzer (38).

Figure 2:
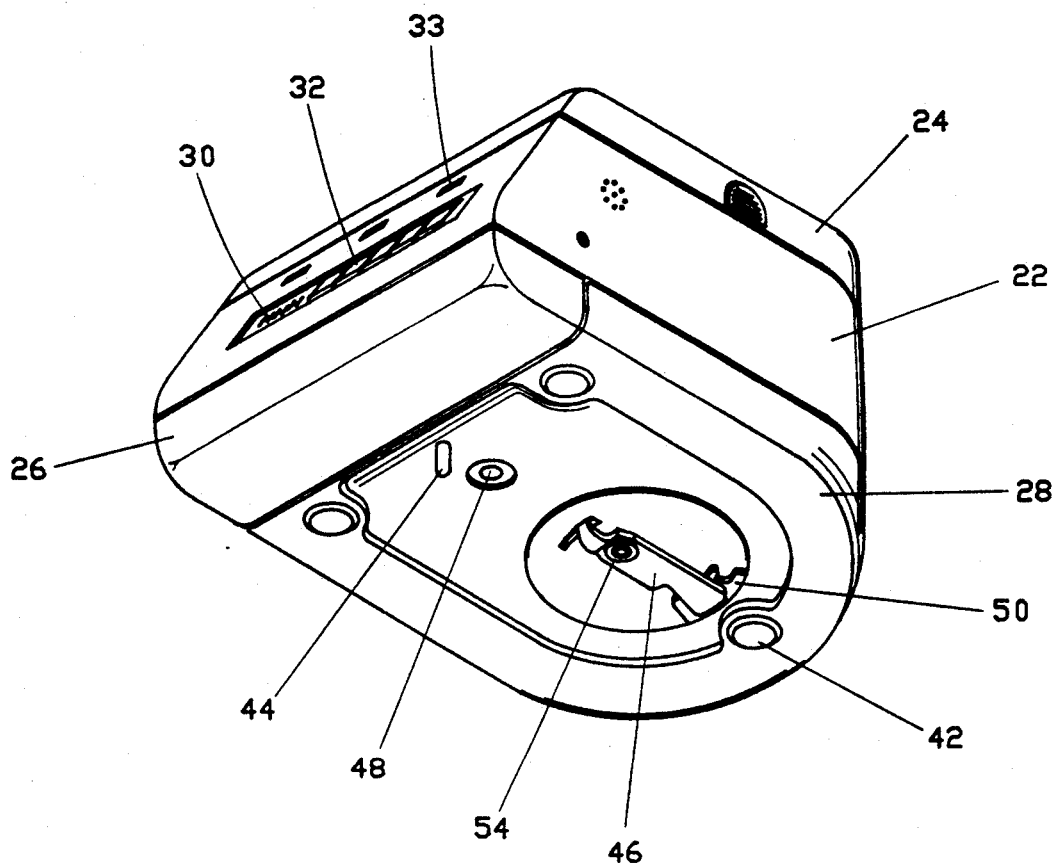
FIG. 2 is a perspective view of Front, Right Side and Bottom aspects of material dispensing apparatus.

Turning to FIG. 2 The Automatic Dispensing Feeder is shown in a perspective view with the main body (22), data display panel (30), programming push buttons (32) and indicator lights (33,34,35) and includes a right aspect view of the main housing (22). In addition, a view of the bottom can be seen with the base (28) behind the battery compartment cover (26) and shutter door (46) in a closed position.

Figure 3:
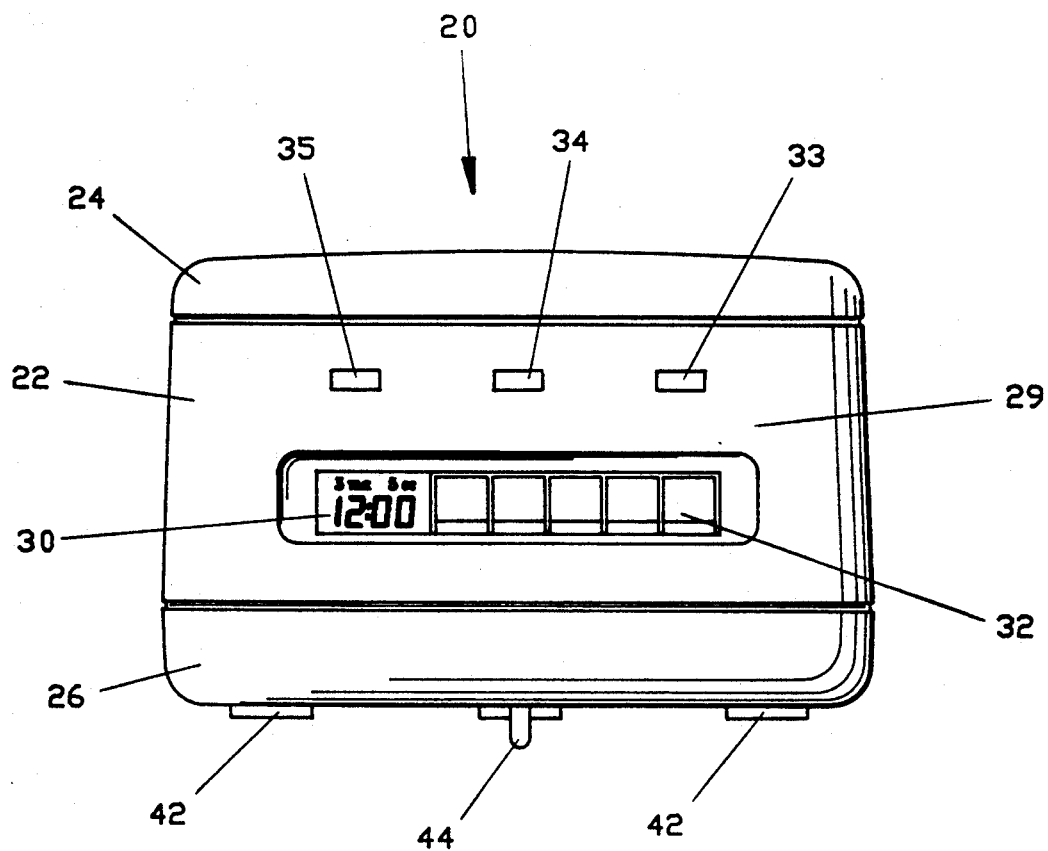
FIG. 3 is a view of Front aspect showing Display and Programming Input Push Buttons.

FIG. 3 represents a front view of the Automatic Dispensing Feeder (20), with the top cover (24) placed on top of the main dispenser housing (22) and below that the battery compartment cover (26). Also displayed on the front control panel (29) of the Automatic Dispensing Feeder (20) is a row of indicator lights to alert the user about operational conditions such as: Low levels of food in housing internal cavity, a material jam in the dispensing mechanism, power over-load, and the shutter door in the open position. Below the row of indicator lights is the data display panel (30) which displays time, feeding cycle time settings, feeding amount at each set feeding, and other programmed analytical information. Included are the programming input push buttons (32), and below the base of the machine are resting feet (42), and position indicator (44) that detects if the feeder is turned over.

Figure 4:
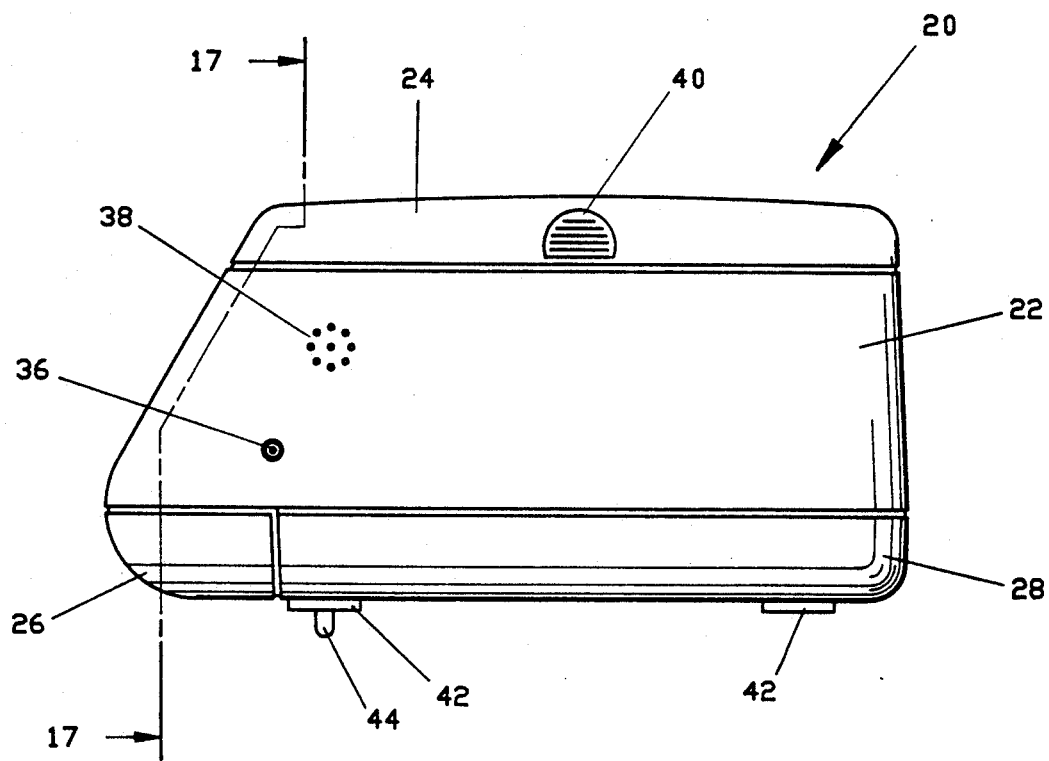
FIG. 4 is a view of Right Side aspects with Electrical Connection to external computer and audio indicator.

FIG. 4 is the right aspect view of the Automatic Dispensing Feeder (20). On top, is the top cover (24) secured to the main housing (22), which can be removed by the release push button (40). Mounted on the side is an electrical data connection (36) for connection of the microprocessor controller to an external computer, and the audio indicator (38) on the main housing (22) and below is the base (28) with the feet (42) and the battery compartment cover (26).

Depressing the two release push buttons (40) allows removal of the top cover (24). Turn to FIG. 5 and observe the top aspect view of the Automatic Feeding Dispenser cavity (23) whereby the paddle wheel (66) is shown with multiple compartments defined by flexible fins (68) which are secured in place by a locking nut (88). This paddle wheel (66) includes an agitator stirrer mechanism depicted with the hub (166) and a plurality of stirrer fingers of varying lengths (70,71) for preventing the stagnation of materials. The fingers are formed with a horizontal section and inclined section that follows the contour of the internal cavity (23) side walls. The stirrer also includes short flexible fingers (72,73) that help to break down large solidified portions of the dry dispensing materials as they rotate next to the stationary fingers (78,79) which extend from the cavity surface (23). A short cover plate (90) is placed above the flexible fins (68) of the paddle wheel (66) and covers three or more compartments, above the dispensing port (52) which cannot be seen in FIG. 5 due to the placement of the cover plate (90) above it.

Figure 6:
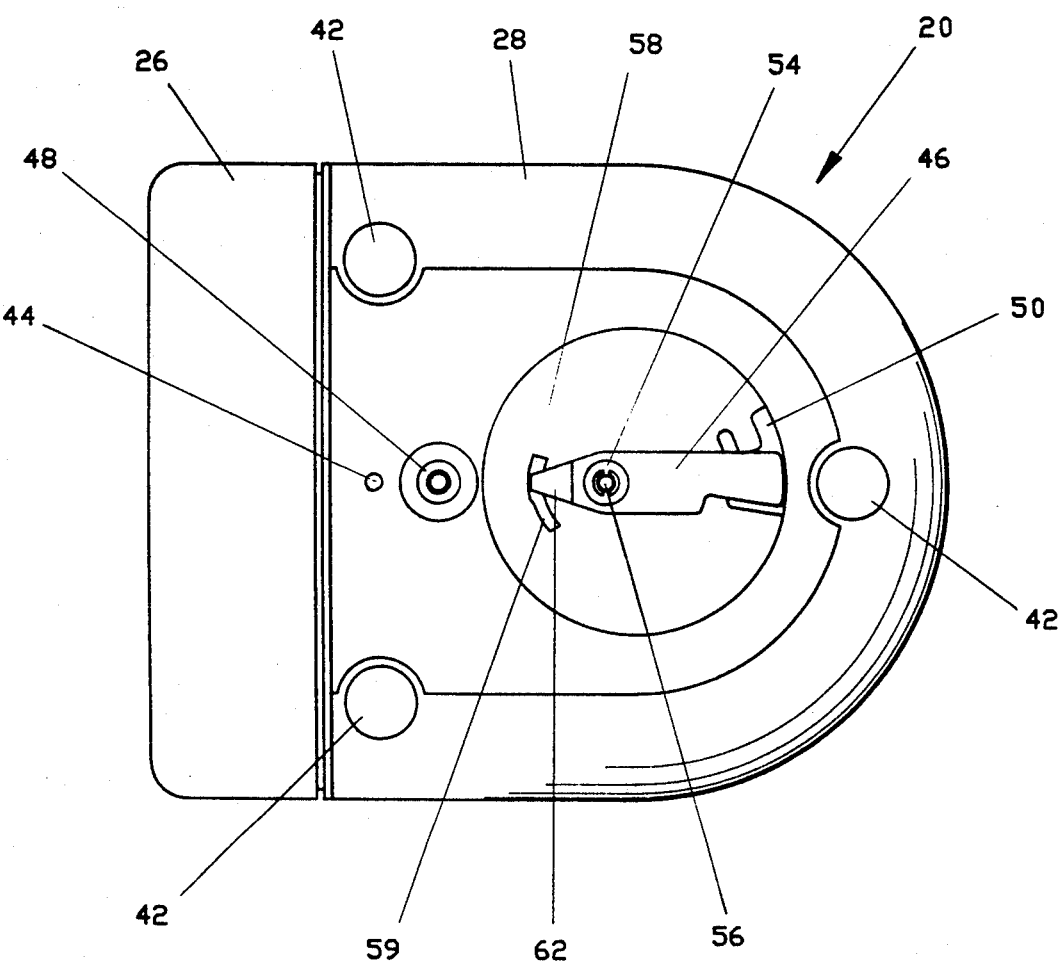
FIG. 6 is a view of the Bottom of the dispensing apparatus showing the Battery Compartment Door, Feet, Shutter Door Mechanism of Dispensing Port. In addition, it provides a view of the Signal Light indicating upcoming feeding cycle.

FIG. 6 depicts the dispensing mechanism as can be seen from the bottom view. To the left is the battery compartment cover (26), to the right of it is the base of the dispenser (28) and three resting feet (42). In addition, a shutter mechanism is shown with the shutter door (46) in the closed position over the dispensing port lips (50) and secured by a grip ring (54) which allows it to rotate freely with limited angular rotation centered on the shaft (56). This shutter door is activated by the inclined tracking tooth (60), as can be viewed in FIG. 8 which sequentially follows the indexes (76) on the inner face of paddle wheel (66). Each of the indexes (76) corresponds to one of the compartments as defined by a pair of flexible fins (68), thus synchronizing the opening of the shutter door (46) and dispensing food from each compartment. After completely dispensing the ingredients from the compartment as the fins (68) have realigned to the dispenser opening (52), the shutter door (46) is released and 'closed' due to the cam (59) which deflects the spring portion (62) of the shutter door (46) and disengages the tracking tooth (60) inward from the indexes (76) on the paddle wheel, thus allowing the door spring (61) to return the shutter door (46) back to 'close' position and complete the electrical contact of the index switch (63).

Figure 5:
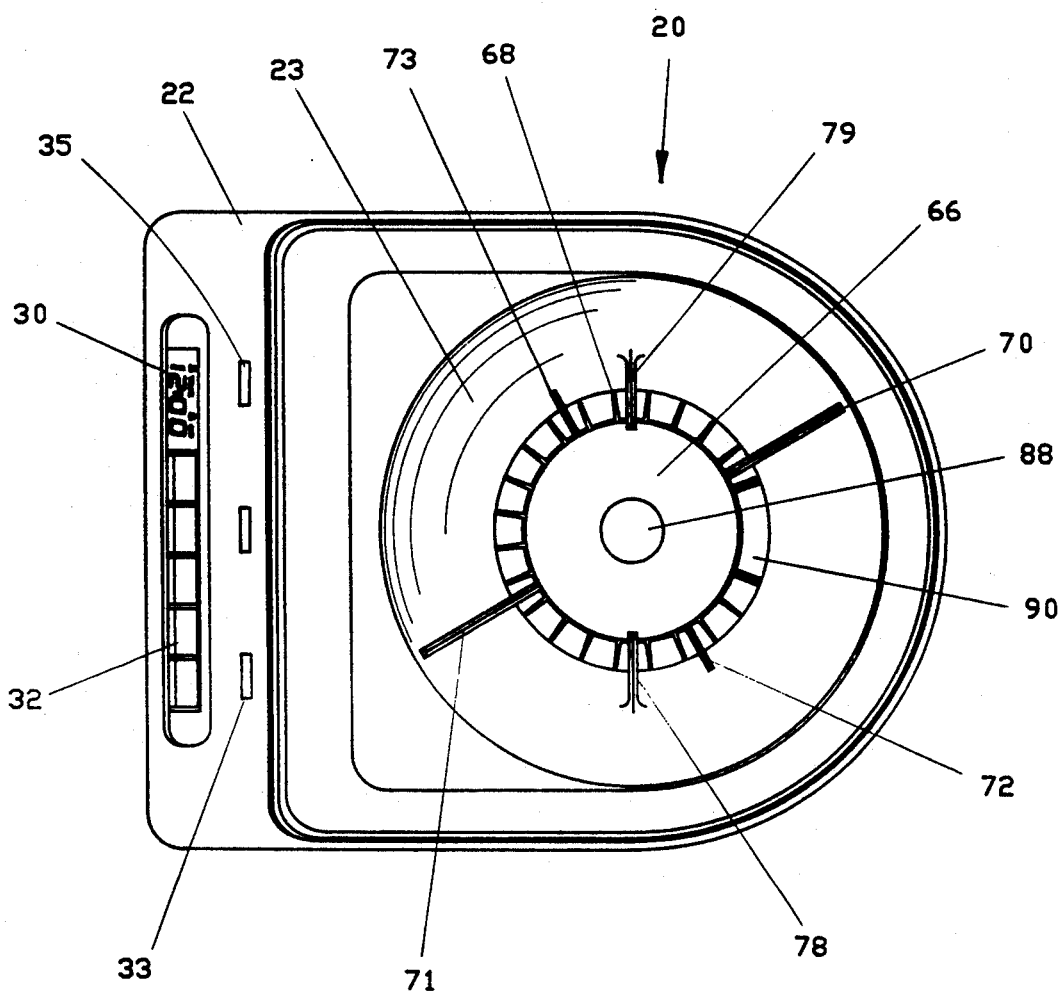
FIG. 5 is a view of the Top of the dispensing apparatus with the cover removed showing the Paddle Wheel and Stirrer.
Figure 7:
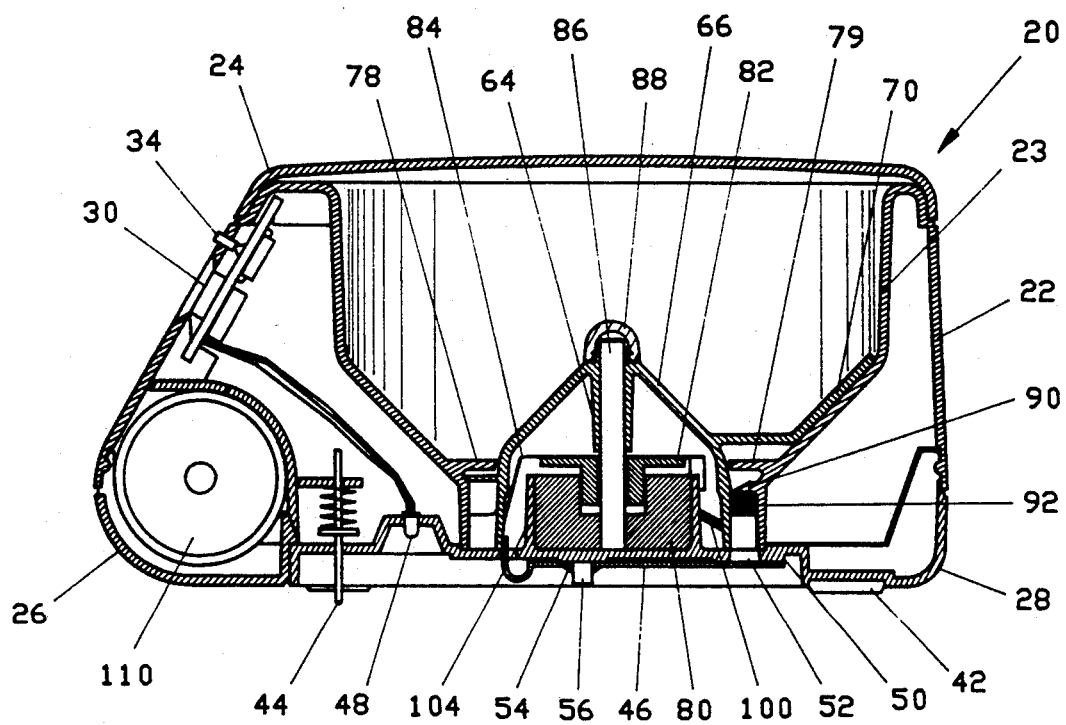
FIG. 7 is a vertical cross sectional view of the dispenser and all subsystems with linear actuator in place; also included in this view is the Orientation Disabling Switch.

FIG. 7 shows a vertical cross section of the dispensing unit along the center symmetry line shown in FIG. 5. This cross sectional view of the Automatic Dispensing Mechanism (20) depicts the entire unit which is comprised of the top cover (24), main housing section (22) which incorporates a storage reservoir (23) with sloping and vertical walls bringing the dry dispensing material in contact with the dispensing mechanism paddle wheel (66). Below is a view of the paddle wheel apparatus with the linear solenoid actuator base coil (80) and the top moving armature (82). To the left is, the display panel (30) and various indicating lights (34). Below this the battery compartment can be seen with battery (110) and battery compartment door (26) secured in place. A position indicating switch (44) is shown in an extended position. It must be depressed to indicate a secure resting position in the proper orientation of the Automatic Dispenser unit to become operational. The indicator light (48) which turns on prior to the feeding cycle is shown extending from the base plate (28) down. To the right is the shutter mechanism which rests on the pivot (56) and secured by a locking grip pin (54).

Figure 8:
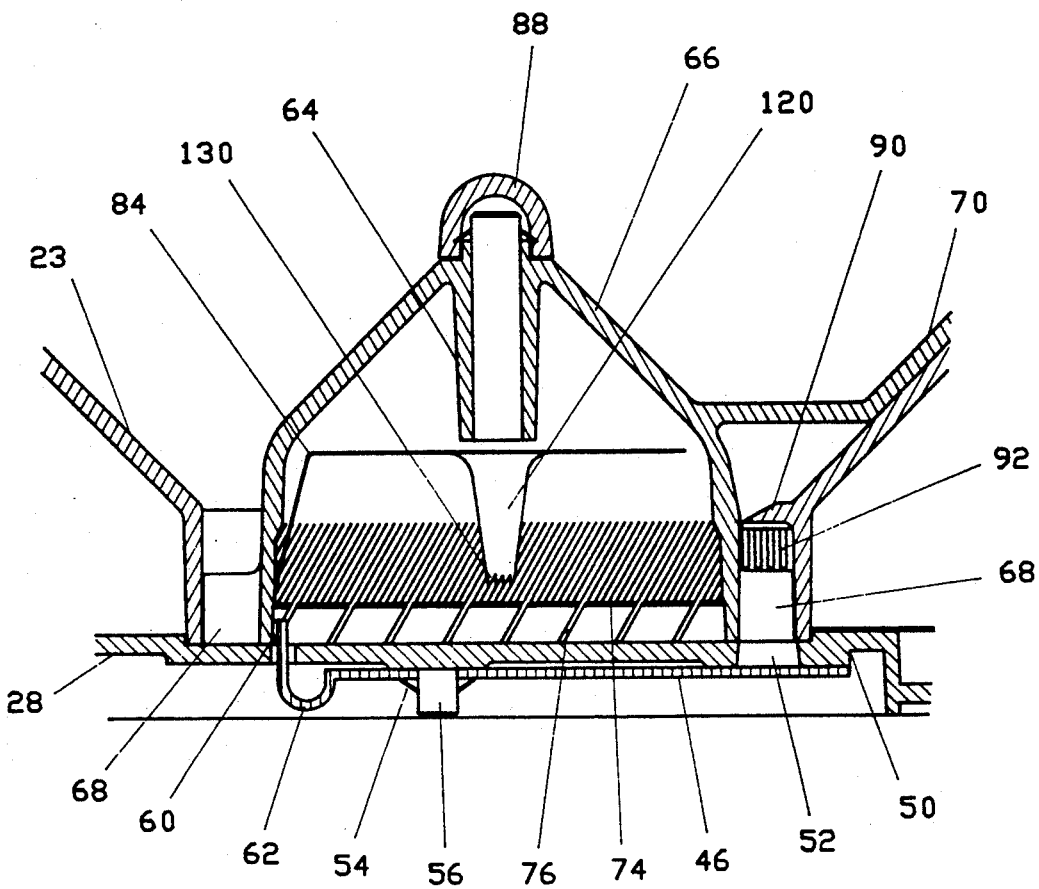
FIG. 8 is an enlarged cross sectional view of Paddle Wheel, Stirrer, Shutter Door, and Transfer Plate with Linear Actuator Solenoid removed.

FIG. 8 is an enlarged vertical cross sectional view of the paddle wheel apparatus with the solenoid linear actuator removed. This shows the material compartment (23) enclosing the paddle wheel (66) in a rotary chamber. The paddle wheel is secured by a locking nut (88) and rotates guided by the cylindrical bearing surface (64) around the stationary shaft (86). A transfer plate (84) which is mounted on the solenoid armature (82) is shown with two of its three flexible arms (120) extending downward and terminates with three teeth (130) that are projected to engage with the helical tracking gear (74). The motion of this transfer plate (84) up and down create a means of rotating the paddle wheel (66) in a clockwise rotation as viewed from the top.

Figure 9:
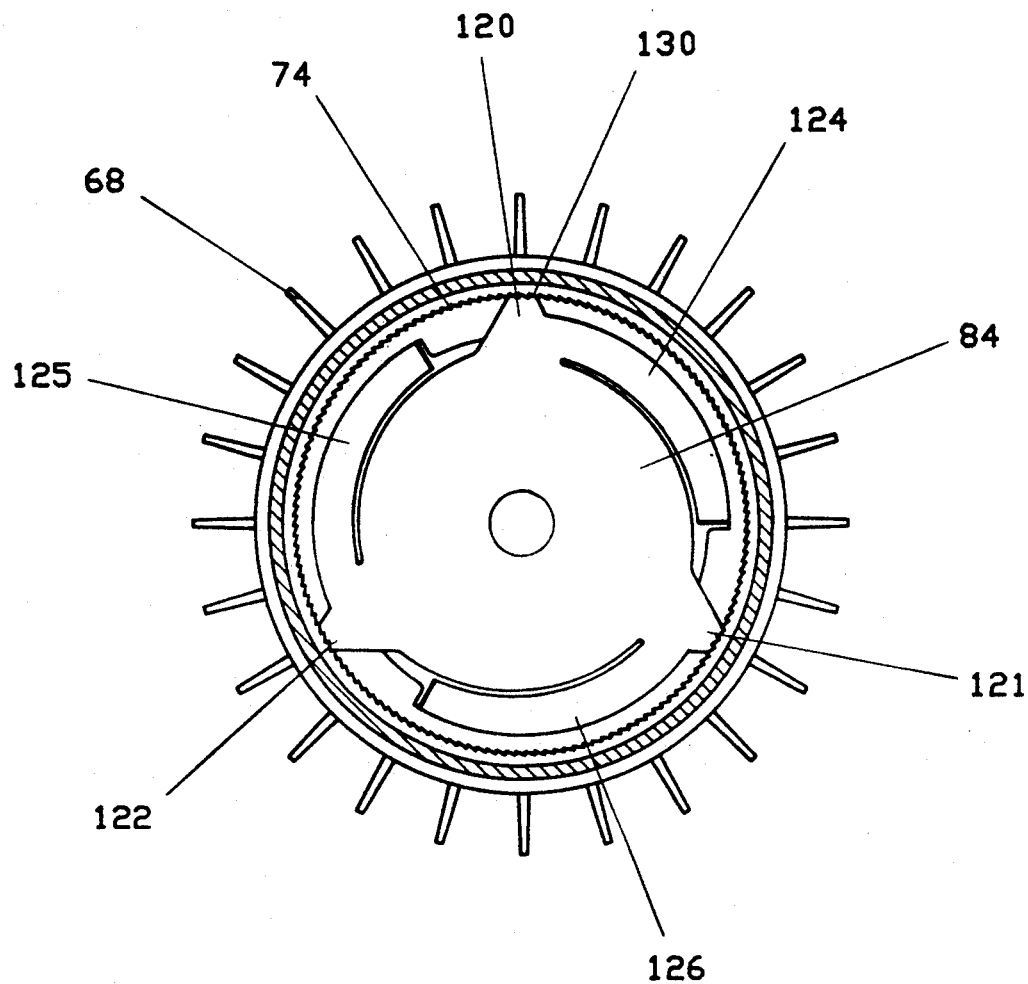
FIG. 9 is a horizontal cross sectional view of Paddle Wheel with the Flexible Transfer Plate showing the Lift Bars and Tracking Teeth.

FIG. 9 depicts the position of the transfer plate inside the paddle wheel where the inclined tracking teeth (130) are engaged with helical inclined gear (74). In addition this view shows the lifting springs (124,125,126) which are designed to retract the solenoid armature upper plate and open the air gap of the solenoid, which will retract the inclined tracking teeth of the transfer plate to a new gear tooth engagement on the helical inclined gear set (74).

Figure 10:
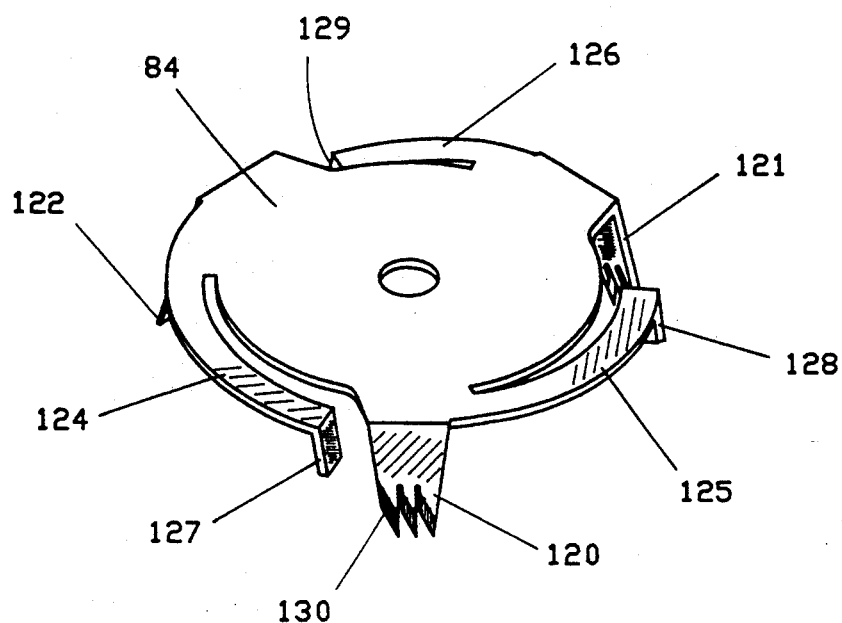
FIG. 10 is a perspective view of the Flexible Transfer Plate showing the Lift Bars, Tracking Teeth and Spring Arms.

FIG. 10 shows the flexible transfer plate in a perspective view. The transfer plate (84) is mounted rigidly to the upper solenoid armature plate and travels in a vertical direction guided by anti-rotating tabs (127,128,129) which are fixed to the solenoid housing (104). The tabs are firmly affixed to prevent the transfer plate from rotating. In addition we can clearly see the inclined tracking teeth (130) mounted on the lower end of the flexible spring arm (120,121,122).

Figure 11:
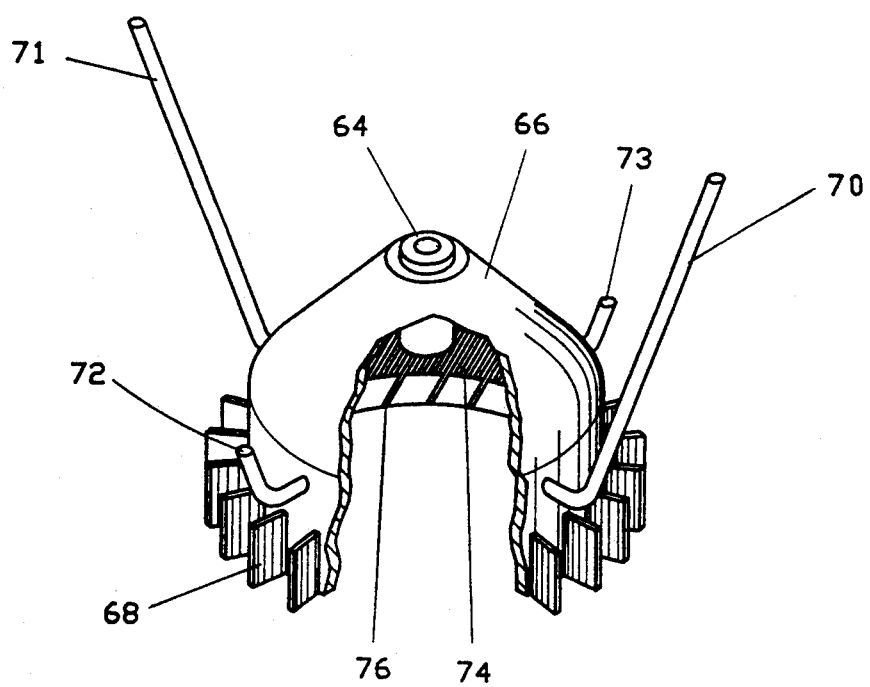
FIG. 11 is a perspective view of Paddle Wheel displaying Flexible Paddle Fins, Stirrer and Helical Tracking Gears.

FIG. 11 depicts a perspective view of the paddle wheel with the stirrer design incorporated into one unit. The paddle wheel contains a main hub (166) with flexible fins (68) extending in a radial direction and defines compartments for precisely measured material to be dispensed. The upper portion stirrer fingers are mounted in different lengths. The stirrer fingers (70,71) are designed to be flexible and prevent material stagnation along the housing cavity walls. Two shorter stirrer fingers, flexible, yet firmer than the previous stirrer fingers (72,73) are designed to break down solidified material and assist in assuring a complete fill of each compartment. Through the break away view of the center we can see the inclined helical gear set (74) and the indexes (76) which coincide with the location of each of the fins (68).

Figure 12:
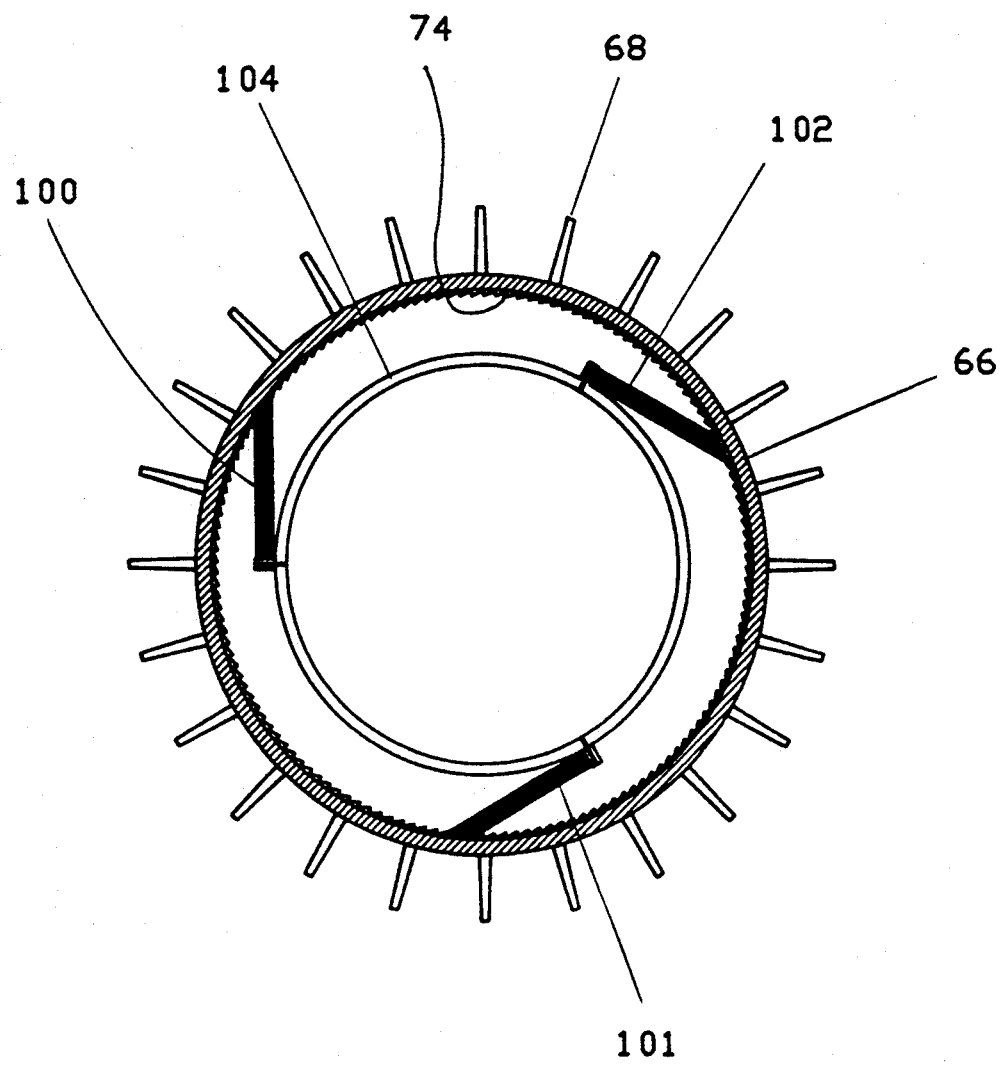
FIG. 12 is a horizontal cross sectional view of Paddle Wheel with Anti-Rotation Bristles/Springs.

FIG. 12 provides a clear view of the anti-rotation tabs (100, 101, 102) mounted on the solenoid housing (104) which engage with the helical gear set (74).

Figure 13A:
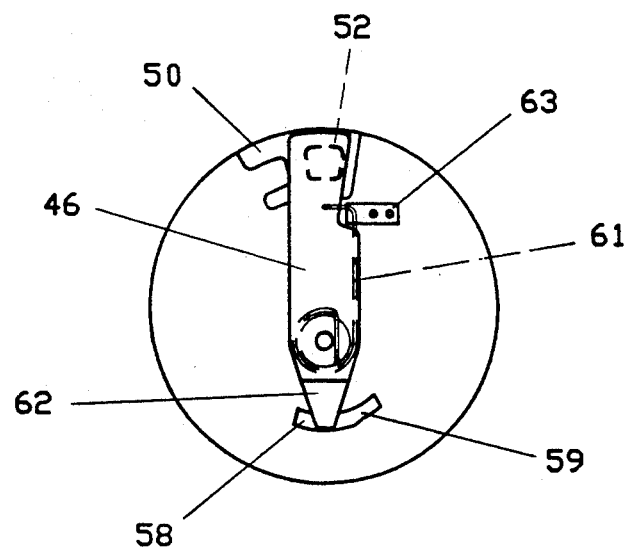
FIG. 13A is a view of Bottom with Shutter Door design shown in the closed position. In addition, the Index Switch is visible.
Figure 13B:
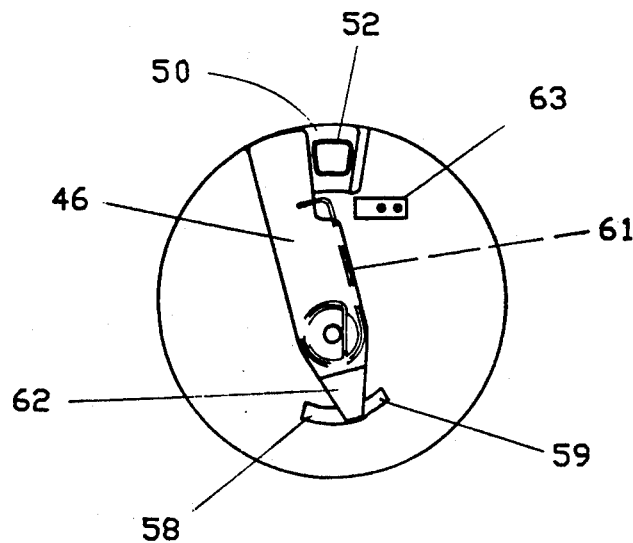
FIG. 13B is a view of Bottom with Shutter Door design shown in the open position. In addition, the Index Switch is visible.

FIG. 13 A&B are provided to describe the two operating positions of the shutter door from a bottom view. 13a: A closed shutter door position can be viewed as the shutter door (46) is resting over the dispensing port (52) on the dispensing port lips (50) maintaining an electrical contact with the indexing switch (63) by the spring (61). 13b: Shows the shutter door in a fully open position whereby the dispensing port (52) is exposed, the spring portion is riding high on the cam (59) prior to its release bringing it to a closed position. In this view the spring (61) is loaded and maintains the index switch in a disconnected mode.

Figure 14:
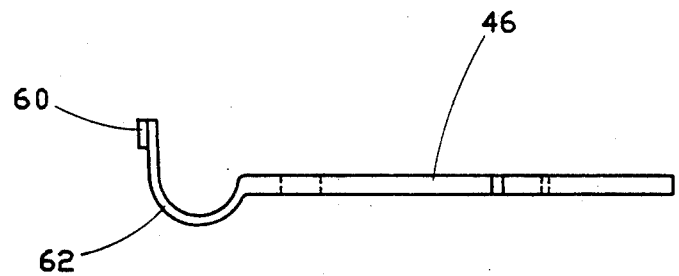
FIG. 14 is a side view of Shutter Door.
Figure 15:
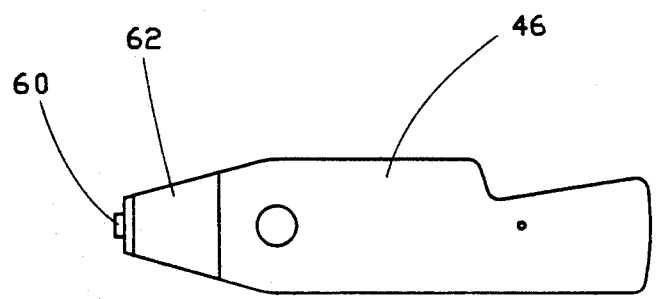
FIG. 15 is a top view of Shutter Door.
Figure 16:
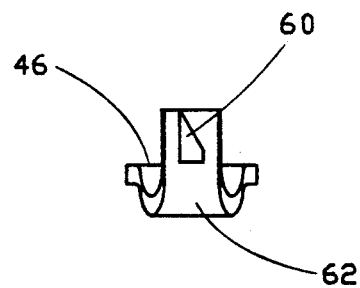
FIG. 16 is a front view of Shutter Door showing Tracking tooth.

FIG. 14, 15 and 16 depict the detailed design of the shutter door with the shutter door spring (62), and inclined tracking tooth (60).

Figure 17:
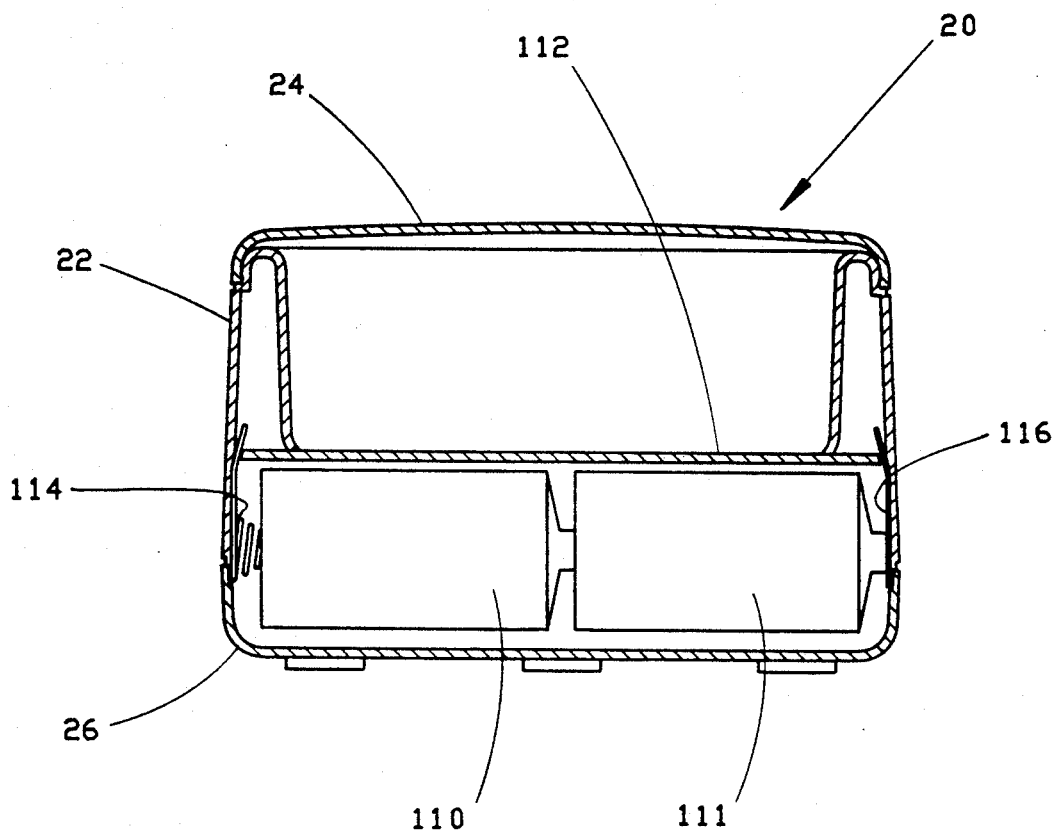
FIG. 17 is a perspective view of Battery Compartment and two Battery Contacts; also included in this view is Orientation Disabling Switch.

FIG. 17 Provides a cross sectional view along the line identified in FIG. 4 and shows the position of the batteries inside the battery compartment and two battery contacts (114, 116).

Figure 18:
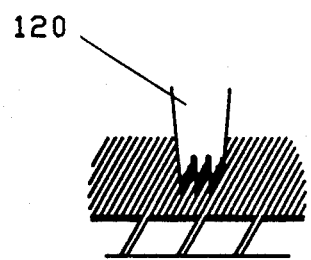
FIG. 18 is an enlarged view of Inclined Teeth engagement with the helical gears.

FIG. 18 is an enlarged detailed view of the inclined tracking teeth with the helical gear set (74).

Figure 19:
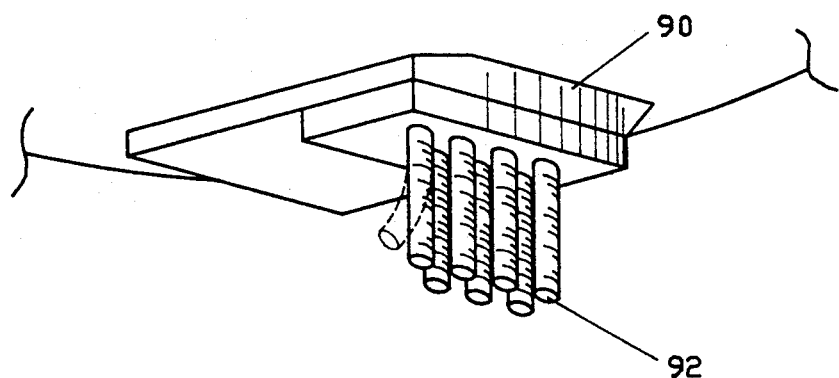
FIG. 19 is a perspective view of Skimmer.

FIG. 19 provides a clear perspective view of the skimmer mechanism which is mounted on the underside of the dispensing port cover (90) and is made of a flexible material, like rubber.

Figure 20:
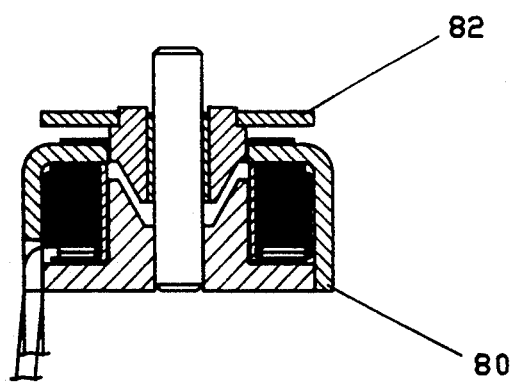
FIG. 20 is a perspective view of the Linear Actuator Pull-Push Solenoid.

FIG. 20 shows a perspective view of the linear pull solenoid.

Figure 21:
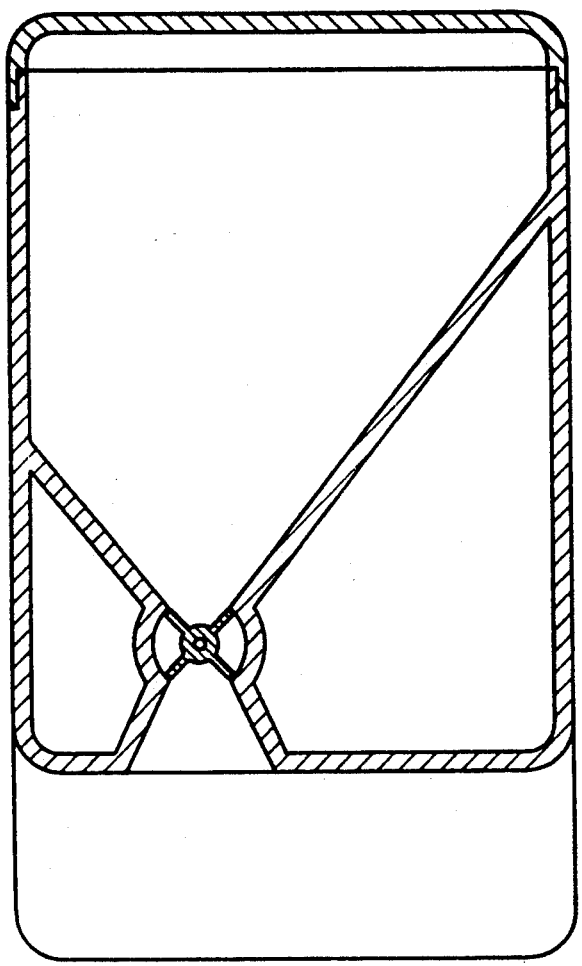
FIG. 21 is an alternative Dispensing Mechanism Design showing a vertical cross section of Dispensing Wheel.
Figure 22:
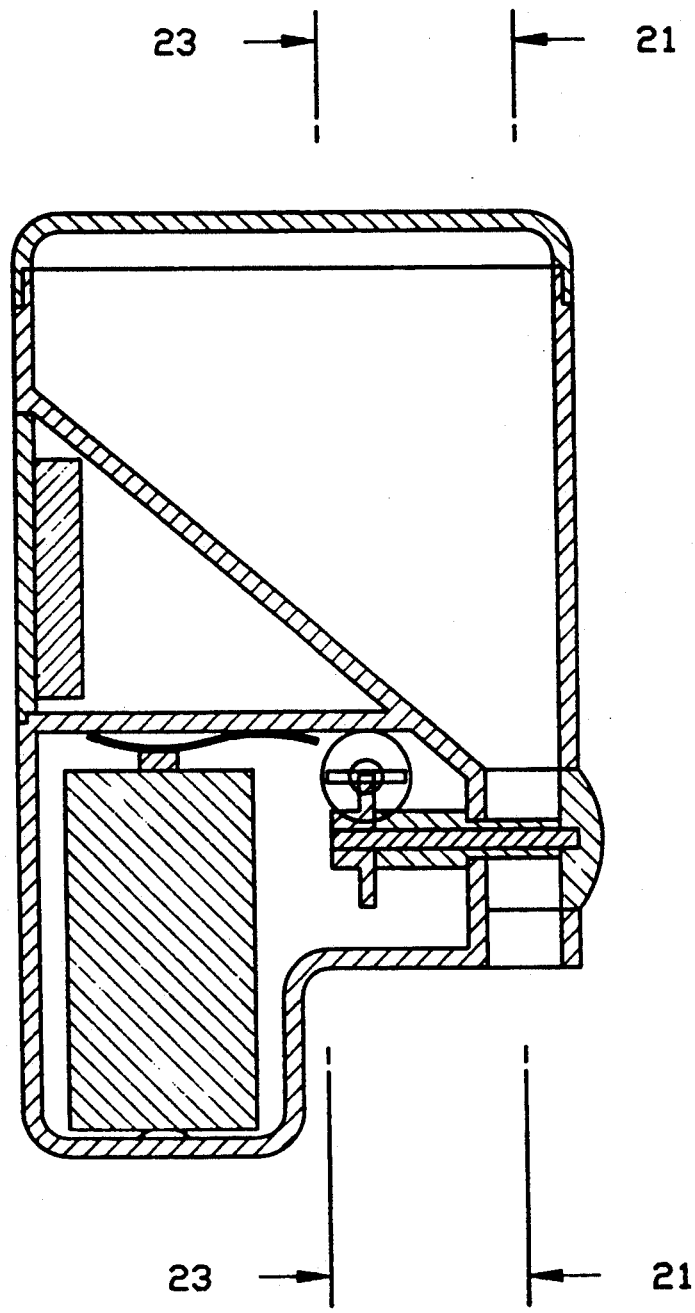
FIG. 22 is an alternative Dispensing Mechanism Design showing a vertical cross section side view of mechanism.
Figure 23:
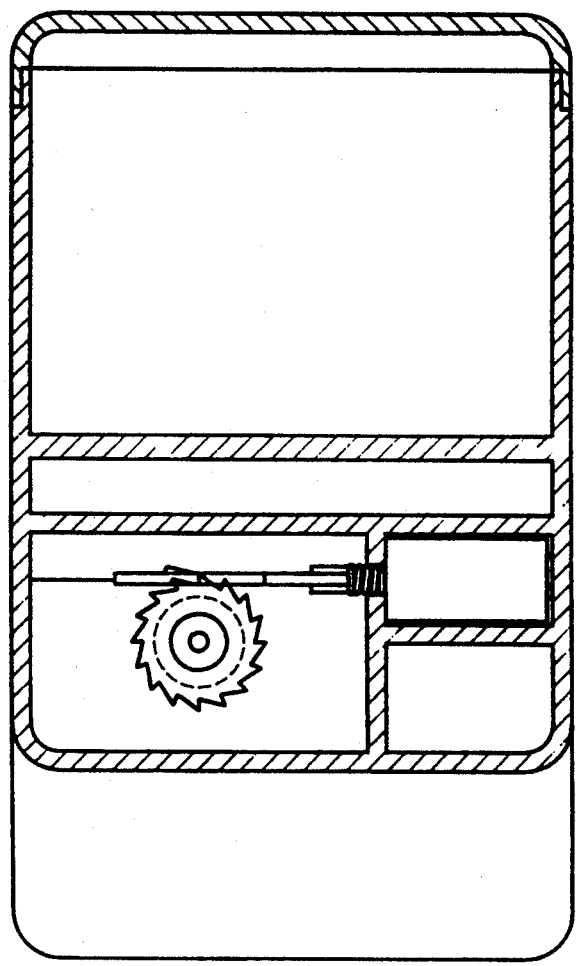
FIG. 23 is an alternative Dispensing Mechanism Design showing a vertical cross section view of Linear Drive mechanism.

In addition to the described dispensing mechanism, and for additional clarification, another comparative design is provided. This design uses a small flexible paddle wheel as can be seen in FIG. 21 driven by a linear actuator solenoid with a rachet tooth mechanism as can be viewed in FIG. 22 and 23. This design follow the same basic principle of the invention described on the previous mechanism.

OPERATION

After removing the top cover (24), by pressing the two locking knobs (40) on each side of the top cover (24), place the dry ingredients to be dispensed in the container (23) and place the top cover (24) back on top of Automatic Dispensing Feeder (20).

Programming the Microprocessor Controller is achieved by selecting the set mode on the microprocessor and inputting the program by depressing the push buttons (32). The user must select the number of feedings desired and the amount of food to be precisely dispensed at each of the feeding cycles. This program as well as other options can be stored in the internal microprocessor or on an external computer. The external computer may be accessed using a cable inserted in the data connection port (36). The external computer can be used to transfer records to and from the feeder, download new or modified feeding programs, monitor the feeder operation, and perform statistical analysis of the feeding data. The manual feed option an be activated by depressing a selected combination of the programming pushbuttons (32). In addition, the Automatic Feeding Dispenser (20) must be resting securely on a flat surface for the orientation switch (44) to be active or the motorized dispensing mechanism will be disconnected, preventing the motorized dispensing mechanism from dispensing if the unit is tipped over or moved to an uneven surface, reducing the risk of accidental spillage of dispensing material.

Before the feeding cycle begins the indicator light (48) will come 'on' to advise the pet of the upcoming feeding cycle, and it can be programmed to stay 'on' during the entire feeding cycle. Likewise, the audio indicator 38 may be programmed to come on before, and stay on during, the feeding cycle. The linear actuator solenoid (80) will become energized and create a magnetic flux across the air gap on top and pull down the solenoid top traveling armature plate (82) to a near-contact position with the base solenoid (80). The transfer plate (84) which is permanently connected to the traveling armature plate (82) will slide down the axial axis. As it travels down the inclined tracking teeth engage with the inner helical gear (74) thereby rotating the paddle wheel (66) around the vertical axis in a clockwise rotation as viewed from the top. This slow rotation in small increments, during which the solenoid armature plate (82) moves in an up and down motion, will vibrate and compact the ingredients in each of the compartments. The compartments as defined by the fins (68) are filled during the rotational motion of the paddle wheel (66), which then rotates under the dispensing port cover (90). Located on the underside of the dispensing port cover (90) leading edge is a flexible skimmer (92) that scrapes the over-fill from the compartments to ensure precise filling before moving to the dispensing port (52), while letting large proportioned materials pass through without jamming the operation of the feeding cycle.

The filled and leveled compartments pass under the dispensing port cover (90) and align accurately above the dispensing port (52) allowing complete discharge of the material. The shutter door (46) is then released back to a closed position due to the deflection of the shutter door spring (62) by the cam (59) located along the outer edge of the access slot (58). This causes the release of the tracking tooth (60) of the shutter door (46) from engagement with the index feature (76) on the underside of the paddle wheel (66). As this process repeats itself, a second compartment slides over the dispensing port (52) thus simultaneously activating the opening process of the shutter door (46).

This process will repeat itself until all the programed amount is dispensed. This cycle will repeat again on the next set feeding time.

It is to understood that other embodiments of the present invention can be developed that come within the spirit and scope of the appended claims.

What is claimed is:

1. A dispensing apparatus comprising:
a housing defining an internal cavity for storing material to be dispensed;
a dispensing port defined by said housing;
means for dispensing a measured amount of material through said dispensing port,
said dispensing means including a paddle wheel assembly having a hub element, a plurality of spaced apart flexible paddles radially extending from an outer circumference of said hub element and defining a plurality of compartments of preselected compartment size;
means for rotating said paddle wheel assembly past said dispensing port;
skimmer means for removing excess material from said compartment before dispensing said measured amount of material through said dispensing port; wherein each said measured amount of material is volumetrically defined by said compartment size, said housing, and said skimmer means; and
means for activating said paddle wheel rotating means, said activating means including linear actuator means for converting a linear motion to a rotational motion.

2. The dispensing apparatus of claim 1 further comprising:
A. agitating means for agitating said stored material in said housing, said agitating means including a stirrer and stirrer rotating means for rotating said stirrer; and
B. activating means for activating said stirrer rotating means substantially simultaneously with said paddle wheel activating means.

3. The dispensing apparatus of claim 2 wherein
said linear actuator means further comprises means for engaging a semiflexible arm element with a helical gear set on a circumferential axis of said hub element.

4. A dispensing apparatus according to claim 3, wherein said linear actuator means is a solenoid.

5. The dispensing apparatus of claim 2 wherein
said linear actuator means further comprises a flexible transfer plate with inclined teeth, fitting into inclined tracking gears on said hub element.

6. A dispensing apparatus according to claim 5, wherein said linear actuator means is a solenoid.

7. The dispensing apparatus of claim 1 wherein:
said dispensing means includes means for automatic dispensing;
said automatic dispensing means including timer means for activating said linear actuator means at a preselected time; and
counter means for activating said linear actuator means until a preselected number of said compartments have rotated past said dispensing port, said preselected dispensing time and said preselected number of compartments defining a material dispensing cycle.

8. The dispensing apparatus of claim 7 wherein:
said dispensing means includes means for controlling said dispensing means, said controlling means comprising a microprocessor, and means for programming said microprocessor;
said programming means including means for entering data defining said material dispensing cycle; and
said microprocessor including means for storing data defining a plurality of material dispensing cycles; and
said programming means including means for changing said stored data defining material dispensing cycles.

9. The dispensing apparatus of claim 8 wherein:
said dispensing means includes input means for controlling said microprocessor, said input means comprising at least one from the group consisting of a set of push buttons and detection means for sensing external conditions; and
said external conditions including at least one from the group consisting of the position of said paddle wheel and the volume of said stored material in said housing.

10. The dispensing apparatus of claim 8 wherein:
said dispensing means includes data display means for providing an indication, said indication including at least one from the group consisting of time, said stored material dispensing cycles, dispensing status, and error warnings.

11. The dispensing apparatus of claim 8 wherein
said microprocessor including means for storing data from the group consisting of cumulative total volume of material dispensed, analytical information, and statistical information.

12. The dispensing apparatus of claim 8 further including electrical connection means for transferring said data defining material dispensing cycles to and from an external computer.

13. The dispensing apparatus in claim 8 wherein
said dispensing means includes an over-ride means for manual dispensing without said timer means; and
said over-ride means does not erase said stored material dispensing cycles.

14. The dispensing apparatus of claim 8 wherein
said microprocessor with said programming means includes selection means for activating any of said programming means on demand;
said selection means including any of the following: a set of push buttons, and detection means for sensing external conditions.

15. The dispensing apparatus of claim 1 wherein
said dispensing means includes index switch means for ensuring that said paddle wheel rotation ceases only when at least one of said compartment is substantially aligned with said dispensing port;
said index switch means including a plurality of spaced apart indexes extending from any circumference of said hub element; and further including means for detecting said indexes.

16. The dispensing apparatus of claim 1 wherein
said skimmer means includes means for removing large particulate of said material without locking said paddle wheel rotation and without shearing said material;
said skimmer means comprising multiple flexible projections.

17. A dispensing apparatus, comprising:
a housing defining an internal cavity for storing material to be dispensed;
a dispensing port defined by said housing;
means for dispensing a measured amount of material through said dispensing port, said dispensing means including a paddle wheel assembly having a hub element, a plurality of spaced apart flexible paddles radially extending from an outer circumference of said hub element and defining a plurality of compartments of preselected compartment size;
means for rotating said paddle wheel assembly past said dispensing port;
means for activating said paddle wheel rotating means, said activating means including linear actuator means and means for converting a linear motion to a rotational motion,
said means for converting a linear motion to a rotational motion including a semiflexible projection engaging with a gear set on a circumferential axis of said hub element;
the apparatus further including a retracting means for advancing said projection from one gear position to another position.

18. A dispensing apparatus, comprising:
a housing defining an internal cavity for storing material to be dispensed;
a dispensing port defined by said housing;
means for dispensing a measured amount of material through said dispensing port;
said dispensing means including a paddle wheel assembly having a hub element, a plurality of spaced apart flexible paddles radially extending from an outer circumference of said hub element and defining a plurality of compartments of preselected compartment size;
means for rotating said paddle wheel assembly past said dispensing port;
means for activating said paddle wheel rotating means, said activating means including linear actuator means and means for converting a linear motion to a rotational motion,
said means for converting a linear motion to a rotational motion including a semiflexible projection engaging with a gear set on a circumferential axis of said hub element; and wherein
said linear actuator means is electrically powered and is activated by battery power means for maintaining uninterrupted power for extended periods of time.

19. A dispensing apparatus comprising:
a housing defining an internal cavity for storing material to be dispensed;
a dispensing port defined by said housing;
means for dispensing a measured amount of material through said dispensing port;
said dispensing means including a paddle wheel assembly having a hub element, plurality of spaced apart flexible paddles radially extending from an outer circumference of said hub element and defining a plurality of compartments of preselected compartment size;
means for rotating said paddle wheel assembly past said dispensing port at a paddle wheel rotation rate;
means for activating said paddle wheel rotating means, said activating means including linear actuator means and means for converting a linear motion to a rotational motion;
said means for converting a linear actuator motion to a rotational motion including a semiflexible projection engaging with a gear set on a circumferential axis of said hub element; and
a shutter means positioned under said dispensing port;
activating means for opening said shutter in sequence with a material dispensing cycle;
said shutter activating means comprising a plurality of projections set on a circumferential axis of said hub element; said projections engaging said shutter means and causing it to rotate said shutter means in a predetermined direction;
said shutter activating means opening said shutter at a shutter opening rate, said shutter opening rate being substantially faster than said paddle wheel rotation rate for ensuring uninterrupted discharge of said material through said dispensing port.

20. The dispensing apparatus of claim 19 wherein
said shutter means including shutter closing means;
said shutter closing means comprises spring means which in a relaxed position maintains said shutter in a fully closed position under said dispensing port.

* * * * *